United States Patent [19]

Nicolas et al.

[11] Patent Number: 4,562,866
[45] Date of Patent: Jan. 7, 1986

[54] LOWER POWER ELECTROMAGNETICALLY CONTROLLED FLUID OPERATING VALVE

[75] Inventors: Michel Nicolas, Plaisir; Michel Lèpine, Levallois Perret, both of France

[73] Assignee: La Telemecanique Electrique, France

[21] Appl. No.: 639,047

[22] Filed: Aug. 9, 1984

[30] Foreign Application Priority Data

Aug. 12, 1983 [FR] France ............... 83 13249

[51] Int. Cl.⁴ ............................................. F16K 31/10
[52] U.S. Cl. .......................... 137/625.65; 251/129.20; 137/625.64
[58] Field of Search ...................... 137/625.65, 625.64; 251/138

[56] References Cited

U.S. PATENT DOCUMENTS

| | | | |
|---|---|---|---|
| 2,862,684 | 12/1958 | Ander | 251/138 X |
| 3,211,417 | 10/1965 | Ray | 251/138 |
| 3,470,911 | 10/1969 | Dunn | 137/625.64 |
| 3,654,963 | 4/1972 | Ages | 137/625.65 |
| 3,683,962 | 8/1972 | Good | 251/138 X |
| 3,827,672 | 8/1974 | Stampfli | 137/625.65 X |

FOREIGN PATENT DOCUMENTS 301739 10/1932 Italy ..................................... 251/138

Primary Examiner—Arnold Rosenthal
Attorney, Agent, or Firm—William A. Drucker

[57] ABSTRACT

A small low power electromagnetic valve is provided using valving means for providing pneumatic switching. Two orifices connected respectively to the pressure and to the discharge side are alternately closed by a first valving means carried by the plunger core of an electromagnet and respectively by a second valving means associated with a weak spring; a lever receives one end of the plunger core and the active face of said second valving means at pivoting distances, 1 and L, such that $$\frac{L}{l} \leq \left(\frac{\phi_1}{\phi_2}\right)^2 + \frac{\phi_1}{\phi_2}$$

where $\phi_1$ and $\phi_2$ are diameters of the orifices.

8 Claims, 6 Drawing Figures

4,562,866

LOWER POWER ELECTROMAGNETICALLY CONTROLLED FLUID OPERATING VALVE

FIELD OF THE INVENTION

The invention relates to an electromagnetically fluid operating valve comprising an electromagnet having an axially guided ferromagnetic movable core, returned by a spring to a first rest position and attracted into abutment in a second working position by a fixed ferromagnetic yoke part when the electromagnet coil is energized a valve body which is associated with this electromagnet and in which there move, facing two orifices connected respectively to a pressurized fluid inlet opening and to an exhaust opening, two valve members one of which closes the pressurized fluid inlet orifice when said movable core is at rest, whereas the other closes the exhaust orifice when said movable core is in its working position, so as to connect one utilization opening placed on an external face of the valve body to one of these two orifices. Such electromagnetically controlled fluid operating valves are widely used for delivering compressed fluids either to user apparatus such as hydraulic actuating cylinders when they are of large size or, when they are of reduced size, to the control inputs of distributors which deliver fluids to pneumatic apparatus of all kinds.

DESCRIPTION OF PRIOR ART

When the dimensions of the electromagnetically controlled fluid operating valves become very small for example for reducing the electric power consumption of the electromagnets so that they may be supplied directly by automatic control electronic installations such as programmable sequencers, the role which the manufacturing tolerances, as well as the supply voltages and the ambient temperature play in the operation of the valve becomes such that any variation of the dimensions will risk causing hazardous operation.

Since the manufacturer has no control of the temperature in which the electromagnetic valves will be placed and since an increase in temperature will unfavorably combine with voltage drops whose occurence is often inevitable, for reducing the power of the order of a watt which such miniaturized electromagnets develop, it results that the added effects of the manufacturing tolerances shall not require a power increase, for the pneumatic switching functions to be executed under good conditions. The starting air gap of the electromagnet shall be maintained and the dimensions which come into play in the alignment of the surfaces of the valve member with the seats of the orifices which receive them shall be properly controlled.

The prior art apparatuses, in particular those which use a simple valve member placed between a pressurized fluid inlet orifice and an exhaust orifice must, in order to provide good operation, impose on the mechanical parts very tight manufacturing tolerances and on the materials a very great regularity of the elastic properties, which substantially increase the technical costs of manufacture.

These costs comprise particularly either the rejection of defective apparatus, or the replacements provided for under the guarantees, or else the additional complications or the man hours required for carrying out adjustments on apparatus whose dimensions differ too much from the manufacturing standards; in some cases, it is sometimes necessary to match up parts which are called on to cooperate.

SUMMARY OF THE INVENTION

It is an object of the invention is then to provide a miniature electromagnetically controlled fluid operating valve having the general above mentioned construction, in which the dimensions of the face of the valve body comprising the openings are close to 15 by 15 mm, and whose internal arrangement substantially reduces the harmful role played by manufacturing size variations or the ageing of the materials so as to limit the powers which the electromagnet of the valve will have to develop.

According to the invention, these orifices are placed at different distances from the axis of rotation of a pivoting lever which is associated with the movements of the movable core for cooperation with two separate valve members, a first valve member which controls the pressurized fluid inlet orifice being carried by one end of the movable core, whereas a second valve member which controls the exhaust orifice resiliently cooperates with the exhaust orifice when the movable core is in its working position with a movable end of the lever against which this second valve member bears when the movable core is at rest.

BRIEF DESCRIPTION OF THE DRAWINGS

FIG. 1 is an elevational view in section through a plane Q of FIG. 2 and containing the axes of the coil and the orifices;

FIG. 2 is a right hand side view of the body of the valve with its cover removed;

FIG. 3 is a top view of the valve body in section through a plane P of FIG. 1;

FIG. 4 shows a modification of the lever;

FIG. 5 diagrammatically illustrates the lever, the valve members and the orifices which they control; and FIG. 6 shows another embodiment of the fluid-operating valve.

DESCRIPTION OF THE PREFERRED EMBODIMENTS

Figure 1:
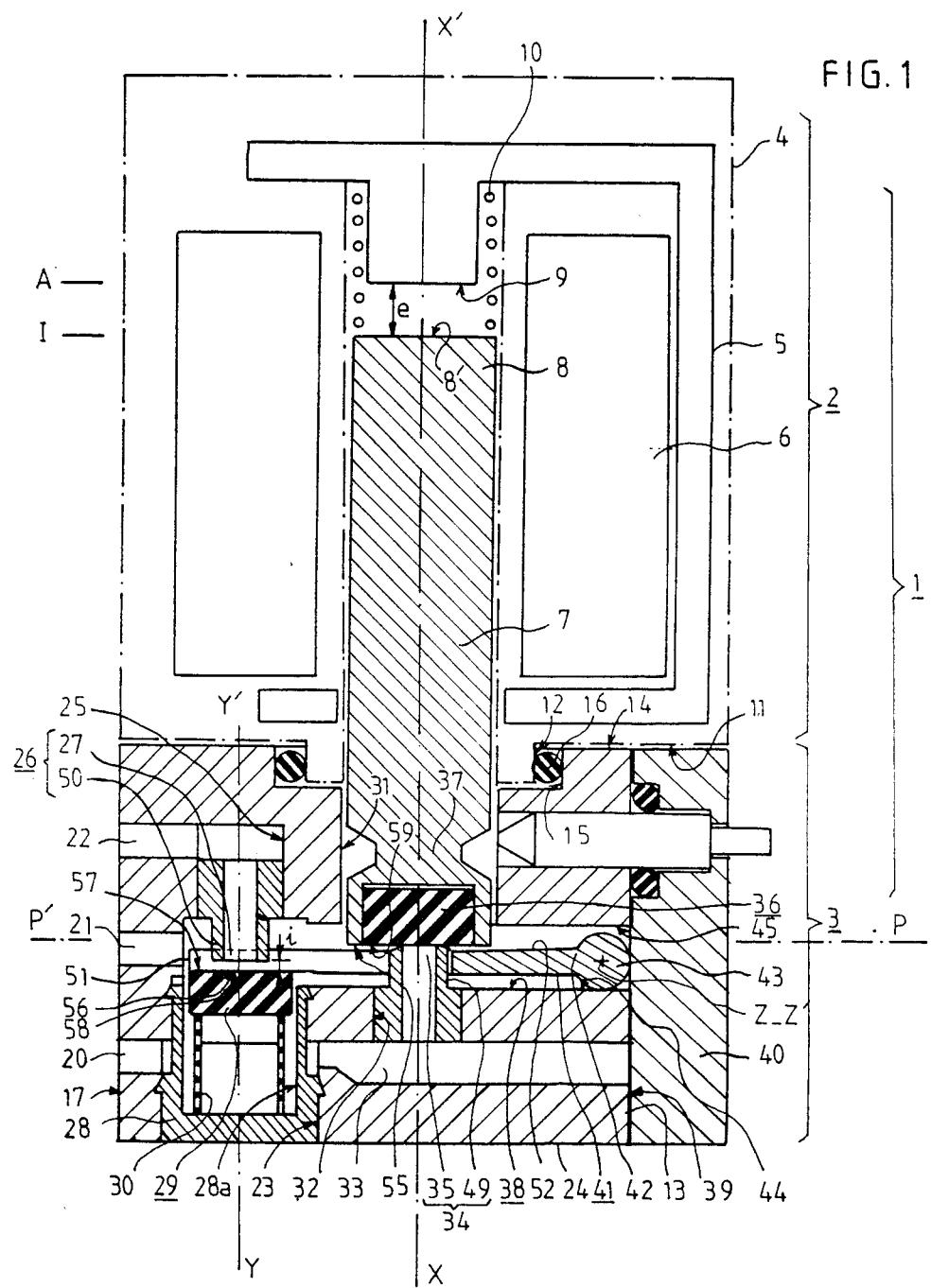
FIGS. 1 to 6 illustrate a preferred embodiment of the valve.

The electromagnetically controlled fluid-operating valve 1 shown in FIG. 1 is formed by the association of a low power electromagnet 2 and a small pneumatic valve 3. The electromagnet whose fixed parts are integrally molded so as to form a body 4 comprises a fixed magnetic circuit yoke 5, a coil 6 whose external connection terminals are not shown in the Figure and a plunger core 7 movable along axis XX' between a rest position I shown in the Figure and a working position A in which a face 8' of an internal end 8 of the core comes into abutment against a surface of a coaxial extension 9 of the yoke while compressing a return spring 10. Body 4 further has an application surface 11 perpendicular to the axis, centering means or surfaces such as 12 for positioning it with respect to the pneumatic valve body and connection means, not shown, for associating it with this latter.

The pneumatic valve 3, whose body 13 made of metal, or of a material or composite plastic. A bearing surface 14 of body 13 is adapted to cooperate with surface 11 A centering surface 15 cooperates with surface 12 for compressing therebetween a seal 16. A securing face 17 is applied, for example by screws 18, 19, shown in FIG. 3, to a pneumatic apparatus or member to be controlled, which is not shown. The securing face 17 has three openings 20, 21, 22 which serve respectively for supplying the pneumatic valve with pressurized fluid, for supplying the user apparatus with pressurized fluid, and for discharging to the exhaust the pressurized fluid coming from this user apparatus.

Body 3 of the pneumatic valve has an opening 23 with an axis YY' parallel to XX' opening into a face 24 opposite face 14. Opening 23 is extended by a coaxial bore 25 connected to opening 22; this bore holds in position, by clamping, an annular piece 26 having an exhaust orifice 27, whereas a recessed plug 28 closes off opening 23 and receives in recess 28a a valving means made from a resilient material 29 and a weak return spring 30 which tends to apply this latter against the orifice 27 placed opposite.

An opening 31 coaxial with XX' and opening into face 14 is extended by a coaxial bore 32 which opens into a channel 33 connected to the pressurized fluid inlet opening 20; in the illustrated embodiment, which is not limitative, this channel passes perpendicularly through opening 23 while passing around plug 28. Bore 32 holds in position, by clamping, an annular piece 34 similar to the preceding one which has a pressure orifice 35 turned towards bore 31. These two orifices 27, 35, which are therefore parallel and orientated in opposite directions, have their seat placed substantially in a transverse plane PP'. Facing this pressure orifice is placed a valve member made of a resilient material 36 which is carried by one end 37 of the plunger core 7 penetrating into opening 31; the active surface 59 of this valve member is applied against orifice 35 by the return spring 10, so that the position of annular piece 34 determines the rest position I of the plunger core.

A chamber 38 placed transversely with respect to axis XX' leads to opening 21 and to a face 39 which is opposite face 17 and which receives a sealing cover 40 which also closes passage 33.

This chamber also connects the pressure and exhaust orifices to opening 21 and houses a transmission lever 41. This lever, which is placed substantially in plane PP' perpendicular to axis XX', has at one end 42 pivoting means formed by a cylindrical flange 43 placed with a small clearance between two opposite and parallel surfaces 40, 45 of chamber 38 close to the cover. This lever, which extends oppositely to axes XX' and YY' of orifices 35, 27, has at end 51 opposite the flange the shape of a fork 46 whose parallel arms 47, 48 define an oblong opening 60 surrounding the small diameter necks 49, 50 which belong to the annular pieces 34, 26 and surround the orifices 35, 27 (see FIG. 3).

Figure 3:
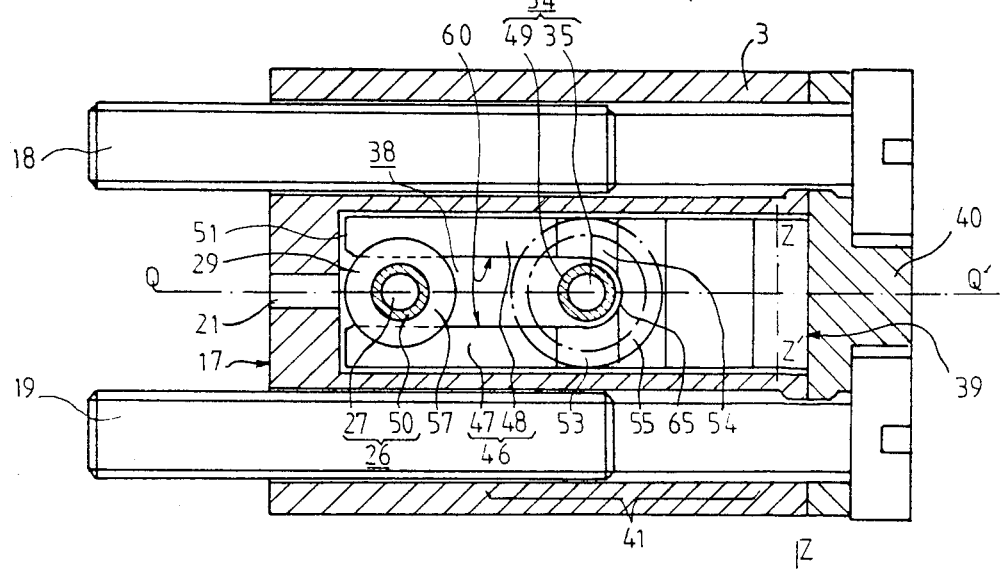

The upper surface 52 of this lever has, on each arm, a boss 53 respectively 54 which is placed facing two opposite portions of the annular surface 55 of end 37 of the plunger core surrounding valve member 36, see FIGS. 1 and 3, whereas the lower surfaces 56, 58, at the ends of the arms of the lever, receive, at two opposite points on the active surface 57 of valve member 29, the small return force developed by spring 30, (see FIGS. 1 and 3); the same spring exerts on lever 41 a low torque which applies bosses 53, 54 to surface 55 so that the lever finds, because of its flange 43 applied against surface 44, a rest position which is the one shown in FIG. 1 and in which a small gap "i" separates the active surface 57 of valve member 29 from the corresponding orifice 27.

The operating states of the valve must either transfer the supply pressure from inlet opening 20 to the user opening 21, or connect this latter to the exhaust opening 22, which is obtained in the rest position shown in FIG. 1. When the coil of the electromagnet is fed with current, the plunger core 7 moves upwardly in the Figure over a distance equal to the air gap "e" until the moment when end 8 comes into abutment against surface 9. If the ratio of the lever arms of lever 41 is equal to 2, e will be slightly greater than i/2. During this movement, the active surface 59 of valve member 36 leaves orifice 35 and this latter is first of all opened; the active face 57 of valve member 29 is then rapidly brought against orifice 27 so that connection between openings 20 and 21 is established.

An arrangement of the valve member such as the one which has just been described has the advantage that only the particular positions of the active faces of the valve members with respect to the corresponding orifices must be taken into account for determining, on the one hand, the rest position of the core and, on the other hand, the useful travel thereof. Since the relative position of the active face 59 of valve member 36 with respect to face 11 may be defined with great accuracy, for example by effecting an axial compression, it is very easy, during assembly, to give the annular piece 34 an appropriate position with respect to face 14. Furthermore, the position of the annular piece 26 may also be given with great accuracy with respect to face 14; finally, the relative position of surfaces 56, 58 of lever 41 with respect to bosses 53, 54 may also be obtained with great accuracy for example during a stamping operation.

Figure 4:
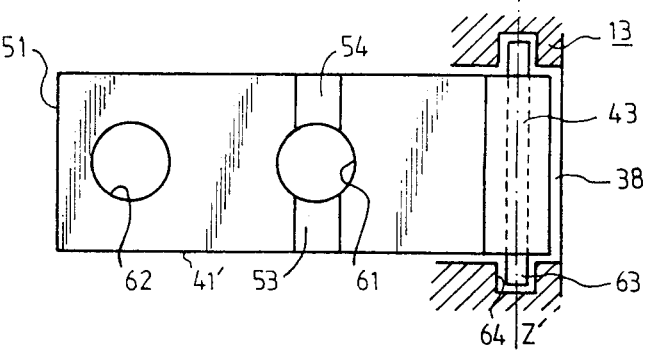

The alignment of the active surfaces of the valve member with the seat of the orifices is moreover strictly obtained because, on the one hand, the plunger core carrying valve member 36 is guided along XX' and, on the other hand, because of the freedom of orientation which is left to the free valve member 29 in recess 28a. In a modified embodiment, shown in FIG. 4, lever 41' comprises two openings 61, 62 through which pass respectively necks 49, 50. Of course, the hingeing device, having an axis ZZ', about which the lever 41 pivots may be replaced by a pivoting arrangement 63, 64 such as shown in FIG. 4; the embodiment of FIG. 1 is however preferred because of its simplicity, of its ease of assembly in plane PP', and of the good accuracy which it may provide when surfaces 44, 45 are obtained during a molding operation of body 13.

Figure 2:
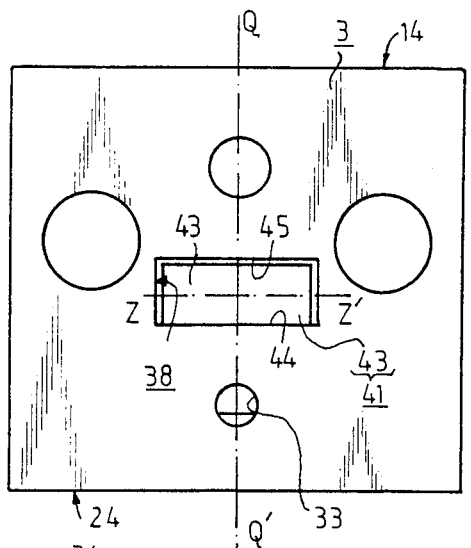

In the embodiment illustrated in FIGS. 1 to 3, the axis ZZ' of lever 41 is held in position, on the one hand, because of the cooperation of flange 43 with cover 40 and, on the other hand, because of the cooperation of bottom 65 of fork 46 with the neck 49 of the annular piece 34. It is clear that if, for reasons of ease of mounting and compactness, chamber 38 and lever 41 have been arranged perpendicular to axis XX' of the mobile piece 7, inclined arrangements of this chamber and this lever could also be used; in this case axes $X_1X'_1$ and $Y_1Y'_1$ of the orifices need not be parallel to each other while remaining substantially perpendicular to successive mutually inclined portions of the lever.

The minimum power of the electromagnet for actuating the core is determined by the necessity of ensuring for orifice 35, when it is open and for a given pressure, a sufficient delivery rate in a sufficiently short period of time and, when it is closed, a perfect sealing; the first two parameters give the values of diameter "$\phi_1$" of this orifice and the travel "e" of the valve member; if $F_o$ is the force exerted by spring 10 when orifice 35 is closed, this force will be chosen so as to counterbalance the force $f_1$ exerted on the valve member by the fluid pressure and also so as to provide resilient compression $f_2$ of the valve member on the seat of orifice 35; therefore $F_o = f_1 + f_2$; if $f_2 = f_1$, it results that $F_o = 2f_1$.

From the $\phi$, "e" and $f_2$ the required adequate ampere turns which the electromagnet must provide can be calculated.

The precision given to the rest position of the electromagnet only depends on the tolerances affecting the distance which between faces 59 and 8' and from the distance separates face 8 and the seat of orifice 35; because of automated levelling of this face 59 with respect to face 8', the corresponding deviations are considerably reduced.

It can be seen that travel of the end 51 of lever 41 will substantially equal "2e" in the embodiment which has just been described.

If orifice 27 and valve member 29 are to be given operating conditions comparable to those which govern the operation of orifice 35 and valve member 36, it can be seen that the required travel "i" of valve member 29 will have to be at least equal to "e", which may be readily obtained by suitably sinking the annular piece 26 during a manufacturing operation not requiring any particular tolerance precautions.

If the diameter $\phi_2$ of orifice 27 is equal to diameter $\phi_1$, the force G exerted by the fluid pressure on valve member 29 for closing the orifice will be used solely for effecting resilient compression of the valve member and the compression force will be chosen equal to $f_2$ so that the two valve members can work under the same compression conditions.

Figure 5:
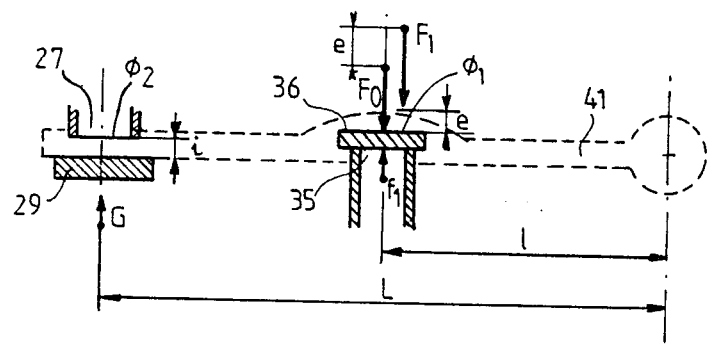

If it is desired to give to the orifices different diameters $\phi_2$, $\phi_1$ while keeping the identity of the compression forces for example so that chamber 38 is drained rapidly, the ratio L/l of the lever arm will be modified (see FIG. 5); the modification of this ratio will be made so that the force $F_1$, exerted by spring 10 when coil 8 is in abutment against surface 9, is greater than $G \times L/l$ so that opening of valve member 26 may take place normally.

Since $F_1$ is chosen very slightly greater than $F_0$, because of the low compression travel "e", one may write, neglecting the role of spring 30:

$$F_1 \neq F_0 \geqq G \times \frac{L}{l}$$

or $$\frac{F_0}{G} \geqq \frac{L}{l}$$

With the preceding notations, this inequality becomes $$\frac{L}{l} \leqq \left(\frac{\phi_1}{\phi_2}\right)^2 + \frac{\phi_1}{\phi_2}, \text{ and if } \phi_1 = \phi_2 \cdot L \leqq 2l$$

It is of course possible to choose the ratio L/l also as a function of the different compression forces of the valve members. Finally, a complete calculation would have to take into account the resilient characteristics of spring 10 with for example $F_1 = KF_0$.

The embodiment illustrated, in which plane P where the lever is placed is substantially perpendicular to axis XX', has been chosen so as to make the valve body as compact as possible, for an application to very small size electromagnetically controlled fluid operating valves, where the pressure intake, exhaust and utilization openings are placed on the same face having a section close to $15 \times 15$ mm.

Figure 6:
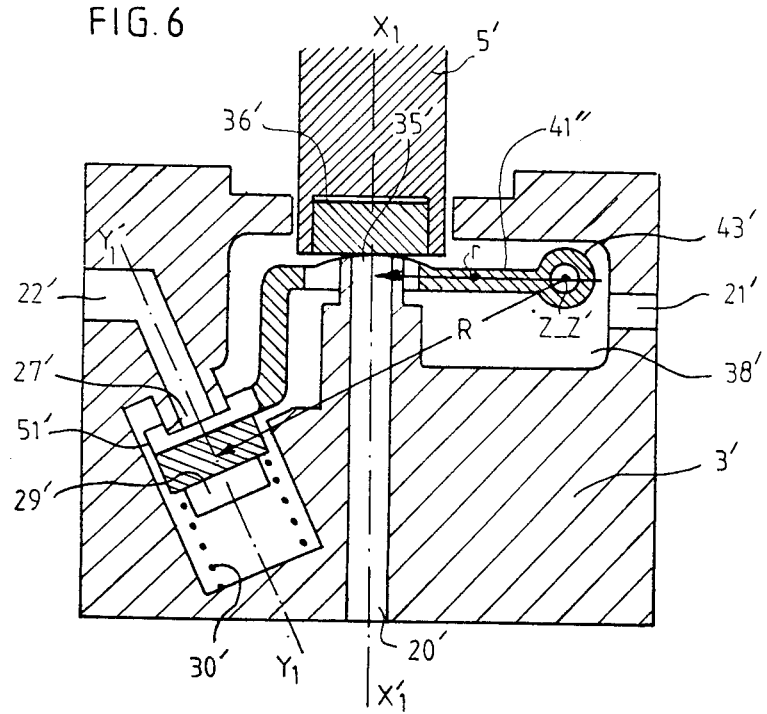

It is clear, for different applications, that the lay-out of the openings may be modified and different orientations may be chosen for the lever and the orifices; in the example shown schematically in FIG. 6, where the references bearing an index designate parts corresponding to those in FIG. 1, it is clear that the radii R and r must be taken into consideration which are equivalent to the lengths L and l.

Finally, if the quality of the metal or plastic material used for body 3 of the valve so allows, the orifices 35,26 may be obtained by direct machining of this body or by a molding operation.

What is claimed is:

1. An electromagnetically controlled fluid-operating valve comprising:

i. an electromagnet having a yoke, an axially guided ferromagnetic movable elongate core, a first spring mounted between said yoke and a first end of said elongate core for biaising said core into an axial rest position, and an electrically energized coil producing a magnetic field attracting the said first end of said core against the action of said first spring in a working position in which it abuts on a surface portion of said yoke, and a cavity formed at the second end of said core, said yoke, said coil and said core forming an integral body having an assembling surface from which the said second end of the core is outwardly projecting;

ii. a packing housed in said cavity;

iii. a valve body having an assembling surface and an elongate well in axial alignment with the said core and in which the second projecting end of said core is housed, the assembling surfaces of the electromagnet body and of the valve body being tightly assembled together;

iv. a chamber provided in said valve body, said chamber transversely extending with respect to the said elongate well;

v. a first bore provided in said valve body and coaxially extending the said elongate well, said bore having an orifice and a first valve seat arranged around said first bore, said first valve seat bearing on the said packing for sealing the said orifice in the rest position of the core, the said first bore communicating with the said chamber in the working position of the core;

vi. A pressurized fluid inlet conduit provided in said valve body and communicating with said first bore;

vii. a second bore provided in said valve body, said second bore communicating with the said chamber and having a bearing surface portion;

viii. a valve member axially guided in the second bore;

ix. a second spring bearing at one end thereof on the said bearing surface portion of the second bore and at the other end thereof on one face of said valve member;

x. a pressurized fluid outlet conduit communicating with said second bore xi. an exhaust conduit and a second valve seat arranged around said exhaust conduit, said second valve seat being adapted for cooperating with an opposite face of said second valve member to seal the exhaust conduit;

xii. a lever housed in said chamber and pivotally mounted at a first point thereof, said lever having a first bearing surface on which the said second end of the core bears in the rest position of said core and a second bearing surface which bears on the said valve member to separate the said valve member from the said second valve seat against the action of the said second spring in the rest position of said core; whereas, in the working position of said core, the said second end of the core releases the lever and, under the action of the second spring, the second valve member, pushes the lever and the said opposite face of the second valve member seals the exhaust conduit.

2. An electromagnetically controlled fluid-operating valve as claimed in claim 1, wherein said level is flat and located in a plane substantially perpendicular to the direction of movement of said core, the said first and second seats being placed substantially in the said plane.

3. An electromagnetically controlled fluid-operating valve as claimed in claim 1, wherein said lever is pivotally mounted about an axis perpendicular to the axes of said first and second bores, said first point of the lever and said second bearing surface being located on opposite end portions of the lever with the said first bearing surface therebetween.

4. An electromagnetically controlled fluid-operating valve as claimed in claim 3, wherein the said first bearing surface is placed substantially half-way between the said first point and the said second bearing surface.

5. An electromagnetically controlled fluid-operating valve as claimed in claim 1, wherein the said first and second bores are respectively formed in first and second cylindrical members which are fitted into the said valve body and pass through at least one opening provided in said lever.

6. An electromagnetically controlled fluid-operating valve as claimed in claim 5, wherein the portion of the lever which extends between the said first and second bearing surfaces, is shaped as a fork having two arms which define the said opening therebetween and engage a neck portion of the said first and second cylindrical members.

7. An electromagnetically controlled fluid-operating valve as claimed in claim 6, wherein each of said two arms is provided with a boss and the said second end of the core has an annular surface which surrounds the said packing, said annular surface bearing on the said bosses.

8. An electromagnetically controlled fluid-operating valve as claimed in claim 1, wherein said chamber opens into a first face of the valve body and the exhaust conduit and the said pressurized fluid outlet conduit opens into a second opposite face of the valve body, the said chamber being closed on said first face by a sealed cover.

* * * * *